US012712653B2

(12) United States Patent
Naffis

(10) Patent No.: US 12,712,653 B2
(45) Date of Patent: Aug. 18, 2026

(54) SYSTEM AND METHOD FOR STREAMING CONTENT IDENTIFICATION

(71) Applicant: ACK Ventures Holdings, LLC, Boca Raton, FL (US)

(72) Inventor: David Naffis, New York, NY (US)

(73) Assignee: ACK Ventures Holdings, LLC, Boca Raton, FL (US)

( * ) Notice: Subject to any disclaimer, the term of this patent is extended or adjusted under 35 U.S.C. 154(b) by 0 days.

(21) Appl. No.: 18/913,634

(22) Filed: Oct. 11, 2024

(65) Prior Publication Data

US 2025/0132850 A1 Apr. 24, 2025

Related U.S. Application Data

(60) Provisional application No. 63/705,826, filed on Oct. 10, 2024, provisional application No. 63/544,788, filed on Oct. 19, 2023.

(51) Int. Cl.
*H04H 60/59* (2008.01)

(52) U.S. Cl.
CPC .................................. *H04H 60/59* (2013.01)

(58) Field of Classification Search
None
See application file for complete search history.

(56) References Cited

U.S. PATENT DOCUMENTS

| | | | | |
|---|---|---|---|---|
| 11,438,675 | B1 * | 9/2022 | Pressnell | H04N 21/812 |
| 2010/0146542 | A1 * | 6/2010 | Weihs | H04N 21/43 725/34 |
| 2011/0080940 | A1 * | 4/2011 | Bocharov | H04N 21/4348 375/240.01 |
| 2014/0150019 | A1 * | 5/2014 | Ma | H04N 21/458 725/34 |
| 2016/0005081 | A1 * | 1/2016 | Albl | G06F 16/4387 705/14.61 |
| 2016/0150292 | A1 * | 5/2016 | Chandler | H04N 21/4316 725/32 |
| 2017/0188072 | A1 * | 6/2017 | Major | H04N 21/2187 |
| 2020/0220909 | A1 * | 7/2020 | Booth | H04N 21/8456 |
| 2021/0337254 | A1 * | 10/2021 | Lykes | G06Q 30/0241 |
| 2021/0368221 | A1 * | 11/2021 | Loheide | H04N 21/8153 |
| 2023/0370698 | A1 * | 11/2023 | Pressnell | H04N 21/812 |
| 2024/0370903 | A1 * | 11/2024 | DiTullio | G06Q 30/0272 |
| 2024/0406469 | A1 * | 12/2024 | Millar | H04N 21/6547 |
| 2025/0132850 | A1 * | 4/2025 | Naffis | H04H 60/372 |

* cited by examiner

*Primary Examiner* — Ricky Chin
(74) *Attorney, Agent, or Firm* — McCarter & English, LLP

(57) ABSTRACT

Systems and methods for identifying content being delivered by streaming platforms are discussed. More particularly, embodiments provide techniques for identifying programs being delivered by streaming platforms that are only partially identified in a request for additional content.

35 Claims, 6 Drawing Sheets

Figure 3A

| Electronic Programming Guide (EPG) 300 | | | |
|---|---|---|---|
| Current Time 10:01 | | | |
| | Current Program | Next Program | Later Program |
| Stream 1<br>Action<br>301 | Top Gun™ (R )<br>1 Hour 18 min left | Midnight Run ™ ( R )<br>11:30 a.m. – 2:00 p.m. | Independence Day ™ ( PG )<br>2:00 p.m. – 4:30 p.m. |
| Stream 2<br>Comedy<br>302 | Blues Brothers ™ (R)<br>1 hour 33 min left | Caddyshack ™ ( R )<br>11:45 a.m. – 1:45 p.m. | Stripes ™ ( R )<br>1:45 p.m. – 4:00 p.m. |
| Stream 3<br>Documentary<br>303 | Abandoned Ruins ™ ( PG )<br>3 min left | Search for the Bismarck ™ (PG)<br>10:15 a.m. – 12:15 p.m. | An Inconvenient Truth ™ ( PG )<br>12:15 p.m. – 2:30 p.m. |

SCTE35 (Ad Break A) @10:01 a.m. 311

SCTE35 (Ad Break B) @10:01 a.m. 312

SCTE35 (Ad Break C) @10:20 a.m. 313

Request G 321 → Request time 10:00, Documentary, PG

Request H 322 → Request time 10:00, Comedy, R

Request I → Request time 10:18, Documentary, PG

SYSTEM AND METHOD FOR STREAMING CONTENT IDENTIFICATION

RELATED APPLICATION

This application claims the benefit of, and priority to, U.S. Provisional Patent Application No. 63/705,826, entitled "System and Method for Identifying Contextual Information in Streaming Content", filed Oct. 10, 2024, and to U.S. Provisional Patent Application No. 63/544,788, filed Oct. 19, 2023, entitled "System and Method for Streaming Content Identification", the contents of both applications incorporated herein by reference in their entirety.

BACKGROUND

In recent years there has been a move away from the traditional model of delivering media via broadcast TV or closed ecosystems like linear cable or satellite TV to Over the Top (OTT) media services which deliver content directly to consumers via the Internet. OTT media services are delivered through streaming platforms that bypass the traditional broadcast, satellite and cable platforms. The content delivered by the streaming platforms may include both video on demand and select live channels of content.

There are a number of different video formats used by the streaming platforms to deliver streaming content including MPEG Dynamic Adaptive Streaming over HTTP (MPEG-DASH or DASH) and HTTP Live Streaming (HLS). Both DASH and HLS are adaptive bit rate techniques and work by dividing the stream of content into smaller segments delivered over HTTP. The segments are encoded before transmission by the streaming platform and decoded by the video/media player on the receiving device prior to display of the content.

BRIEF SUMMARY

Embodiments of the present invention provide techniques for identifying shows being streamed following a request from a streaming platform for additional content that is to be inserted into a stream break. Embodiments enable selection of appropriate content to be provided by a third party in response to the request even when the request fails to fully identify the show for which the additional content is needed.

In one embodiment, a computing device-implemented method to identify content being delivered by a separate streaming platform includes receiving at an additional content server a request for additional content suitable for insertion into a stream of content being delivered by the streaming platform to a user device where the request is accompanied by at least one of a genre and rating for the content being delivered by the streaming platform to the user device but is not accompanied by a name or identifier of the content being delivered by the streaming platform to the user device. The method also includes identifying an app on the user device which is receiving the content. The method further repeatedly downloads manifest files or playlists for streams currently available to the identified app. Additionally the method includes analyzing the manifest files or playlists to identify scheduled breaks in the streams and mapping a time window of the request against the scheduled breaks to identify possible programs in the streams that are currently available. Further, the method includes filtering a list of the possible programs based on at least one of the genre and rating to identify a filtered list of possible programs and delivering or facilitating delivery of additional content to the requesting streaming platform based on pre-determined criteria associated with an identified program when the filtered list identifies only a single program.

In another embodiment, a system for identifying content being delivered by a separate streaming platform includes a computing device that includes at least one processor, the computing device hosting a supply side platform. The supply side platform is configured to receive a request for additional content suitable for insertion into a stream of content being delivered by a streaming platform to a user device, the request accompanied by at least one of a genre and rating for the content being delivered by the streaming platform to the user device but not accompanied by a name or identifier of the content being delivered by the streaming platform to the user device. The supply side platform is further configured to identify an app on the user device which is receiving the content and repeatedly download manifest files or playlists for streams currently available to users of the identified app. The supply side platform is also configured to analyze the downloaded manifest files or playlists to identify upcoming scheduled breaks in the streams and map a time of the request against the upcoming scheduled breaks to identify possible programs in the streams that are currently available to which the request could apply based on the time of the request. The supply side platform is further configured to analyze a list of the possible programs based on the genre and rating to identify a filtered list of possible programs corresponding to the at least one of a genre and rating accompanying the request. The supply side platform is also configured to deliver or facilitate delivery of additional content to the requesting streaming platform based on pre-determined criteria associated with an identified program when the filtered list identifies only a single program. The system also includes a network-accessible source of additional content.

BRIEF DESCRIPTION OF THE DRAWINGS

The accompanying drawings, which are incorporated in and constitute a part of this specification, illustrate one or more embodiments of the invention and, together with the description, help to explain the invention. In the drawings:

FIG. 3A depicts exemplary advertising bid requests in an exemplary embodiment;

DETAILED DESCRIPTION

Figure 1:
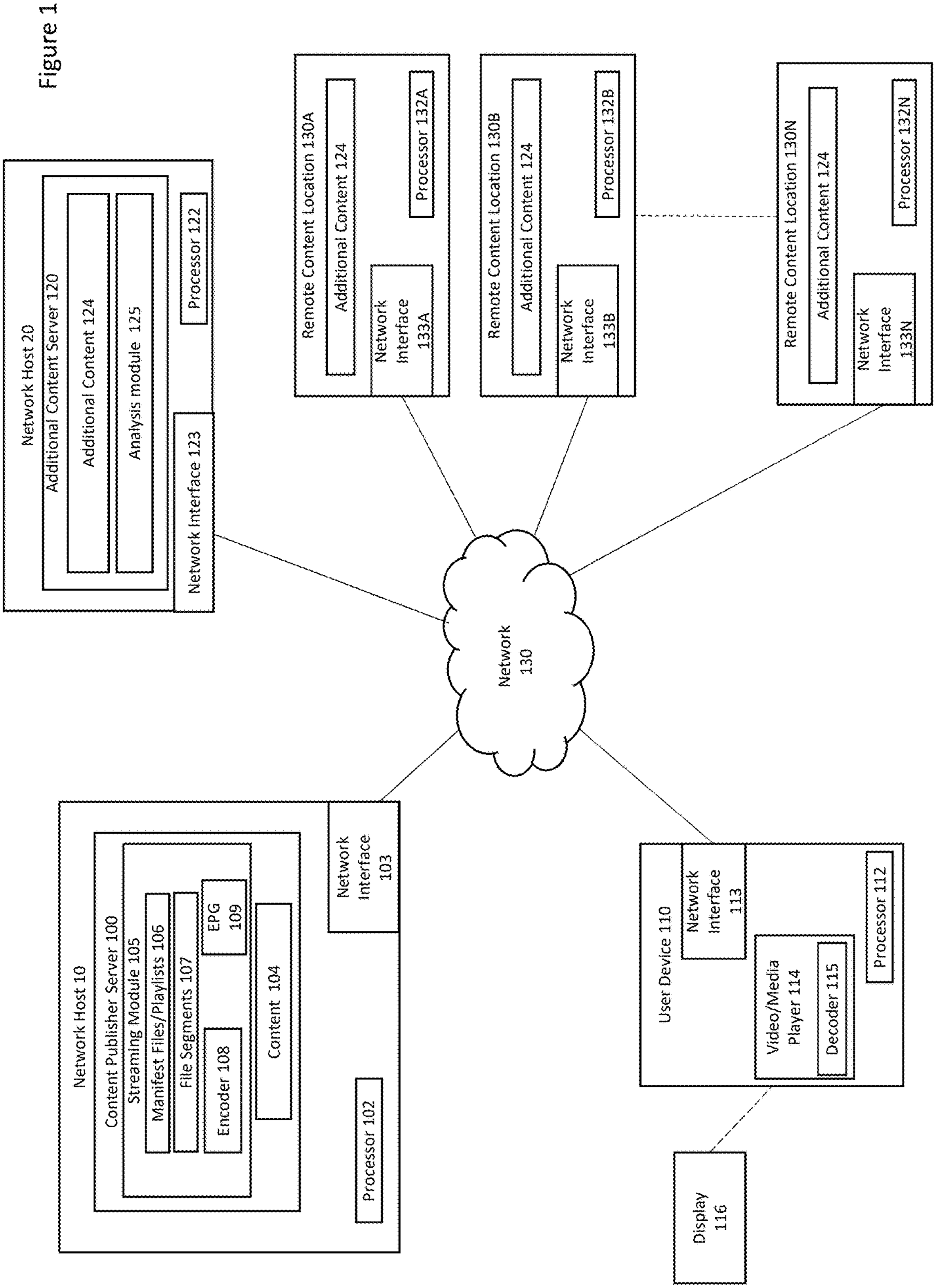
FIG. 1 depicts an exemplary environment suitable for practicing one or more embodiments of the present invention.

The content being delivered by streaming platforms to a user's device may include breaks in the stream where additional content may be inserted for display. For example, the additional content may be relaxing videos such as nature scenes. The additional content may be public service announcements. Likewise the additional content may be additional information related to the program being shown in the stream. The additional content may also be advertisements inserted into the stream. The streaming platform may request this additional content from a $3^{rd}$ party source. However, when requesting the additional content the streaming platform frequently will not fully identify the program in the stream currently being viewed by the user. This presents a problem for the $3^{rd}$ party source of additional content who is seeking to provide appropriate additional content as some additional content may not be appropriate for particular programs and/or the additional content providers may have placed restrictions on where the additional content may be shown.

Embodiments of the present invention address this issue of determining appropriate content by providing techniques to identify the content a user is viewing (e.g.: a TV show or movie) by combining the incomplete data from a request for additional content from the streaming platform with other identified data. As used herein, the request data is incomplete in the sense that it doesn't fully identify the current content being viewed by the user with which the additional content is to be paired. To attempt to address this issue, embodiments use the information contained in the request in combination with other data listing the different streams/channels being provided by particular streaming apps. For example, in one embodiment, the other data may be gathered from a publicly available Electronic Programming Guide (EPG). The data that is provided in the request, such as the time of the request, and the genre and/or rating for the content being streamed, is compared to the EPG or other listing data on current video streams available to the streaming app of the user device receiving content. The comparison finds any channels on the particular streaming platform that are running a program at that time with that information (e.g. genre and/or rating). The manifest files or playlists associated with the identified streams are then examined to attempt to identify a channel within that subset of channels that has a scheduled break in the stream delivering the content that is near the time of the request. Manifest files and playlists are discussed in more detail further below. It should be appreciated that the techniques described herein provide a technical solution to a technical problem that exists only in distributed streaming environments as previous mechanisms for delivering content, such as conventionally providing content via cable TV providers, did not have to address the technical challenge of dynamically providing appropriate additional content while dealing with incomplete information regarding the show into which the additional content was to be inserted.

Currently, requests from publishers/streaming platforms for additional content do not include content data such as the show title, season, episode, or movie title. Publishers do not share this information with the additional content provider for various reasons such as economic and privacy reasons. The additional content provider on the other hand is seeking transparency to identify the content that the additional content is being paired with in order to ensure that appropriate content is provided in response to the request. In traditional linear/broadcast television, additional content providers providing content such as public service announcements, additional content related to the program and additional content in the form of advertisements are able to specify what programs they want to provide additional content against. With OTT media services, such as Free Ad Supported Television (FAST) services the additional content providers are not usually afforded this same opportunity. Embodiments address this issue by using the partial data accompanying the request for additional content in combination with other publicly available data to dynamically determine the additional content to be provided to the requesting publisher/streaming platform.

FIG. 1 depicts an exemplary environment suitable for practicing one or more embodiments of the present invention. A network host 10 hosts content publisher server 100 for a streaming platform and is equipped with one or more processor(s) 102. Content publisher server 100 stores, or provides access to, content 104. Content publisher server 100 includes streaming module 105 that when executed streams content 104 via network interface 103 and network 130 to user device 110. For example, network 130 may be the Internet, a cellular network, a wide area network, or some other type of network to which both network host 10 and user device 110 have access. Streaming module 105 segments content 104 into multiple file segments 107 and uses encoder 108 to encode file segments 107 for transmission. For example, in some embodiments, content 104 may be segmented and encoded to comply with the DASH or HLS standards. It should be appreciated that content may be delivered via other formats other than DASH or HLS and the description of different embodiments herein referring to DASH or HLS should be understood to also include additional formats unless otherwise apparent from the context. The encoded streams may be transmitted as multiple adaptive bit rate streams as discussed further below.

Each stream of content being transmitted by the streaming platform has an associated manifest file/playlist 106 (depending on the format) that includes metadata and other information about the set of segments making up the stream that are read by the media player on user device 110 in order to properly display the streamed content. Content publisher server 100 and/or streaming module 105 may also provide an Electronic Program Guide (EPG) 109 to user device 110 listing information about the current and upcoming scheduled content being delivered to an app from the streaming platform. It should be appreciated that in alternate embodiments EPG 109 may be made available to the user of user device 110 from a different network accessible location rather than being provided directly from content publisher server 100 and/or streaming module 105.

User device 110 is equipped with one or more processor(s) 112 and receives an encoded stream of file segments 107 of content 104 via network interface 113 for an app receiving FAST services. Received file segments 107 and associated manifest files/playlists 106 are provided to video/media player 114. Decoder 115 in video/media player 114 uses the information in the manifest files/playlists to decode file segments 107 so they may be properly displayed to a user on display 116. Display 116 may be wired or wirelessly coupled to user device 110 or integrated into user device for displaying the decoded streamed content to a user. It will be appreciated that user device 110 may take many forms including, without limitation, smartphones, tablets, smart TVs, laptops, desktop computers and Internet connected TVs connected to network 130 in various ways including via the use of connectable network devices such as Roku® devices and Amazon Fire® sticks.

Network host 20 hosts additional content server 120 and includes one or more processor(s) 122. Additional content server 120 has access to, assists in the provision of, and/or stores additional content 124 and receives a request for additional content via network interface 123. In some embodiments, additional content server may include a Supply Side Platform (SSP). Additional content 124 may be stored remotely from additional content server 120 such as on one or more network-accessible remote locations, 130A, 130B and 130C, each of which may be equipped with one or more processors 132A, 132B . . . 132N and a network interface 133A, 133B . . . 133N. Additional content 124 may be provided by network-accessible remote locations, 130A, 130B and 130C and/or by additional content server 120. In some embodiments remote locations 130A, 130B and 130C may be an Ad Exchange, Ad Network or Demand Side Platform (DSP). Additional content 124 may be, without limitation, public service announcements, nature videos (e.g. relaxing nature scenes), additional information related to specific streaming content, and/or advertisements. In some embodiments, additional content server 120 includes analysis module 125. Embodiments utilize analysis module 125, which includes executable software instructions, to attempt to identify current content being streamed to a user by a streaming platform requesting additional content so that appropriate additional content may be displayed during stream breaks of that current content. Analysis module 125 performs at least some of the steps of FIG. 3 and other functionality discussed in more detail below.

Content publisher server 100 and additional content server 120 may be implemented using hardware or software located on one or more network hosts that request/process requests for additional content sent over network 130. Content publisher server 100 and additional content server 120 may be provided via a computing platform that includes one or more processors such as, but not limited to a central processing unit (CPU), graphical processing unit (GPU) and volatile memory such as random access memory (RAM). The computing platform may be, but is not limited to, a server, desktop computer, laptop computer, smartphone, mobile computing device, etc. and may be equipped with one or more flash devices. The computing platform may also include non-volatile storage such as a hard drive holding an operating system (OS) and non-volatile Read Only Memory (ROM) which may hold platform firmware and other data or instructions.

Adaptive bit rate streaming is a streaming technique that dynamically adjusts the presentation of video or audio data based on network conditions and device resources. Adaptive bit rate streaming first prepares the content for streaming by encoding the same content into different files at multiple different bitrates. Each file is split into smaller segments so the receiving video/media player can select an appropriate quality based on network conditions. A manifest file that describes the available stream segments and their bitrates is downloaded by the client device which then requests segments of an appropriate stream for the current network conditions. The media player will frequently switch between different bitrates as conditions change. This adaptive approach reduces buffering which allows the video/media player to deliver an optimal experience for the current conditions.

Dynamic Adaptive Streaming over HTTP (DASH) was developed by the Moving Pictures Expert Group and for that reason is also referred to as MPEG-DASH. DASH is an international standard widely supported on client devices. The content in a multimedia file is partitioned into one or more segments. The segments are encoded at different bitrates and are compressed for delivery over HTTP to a receiving client device. A media presentation description (MPD) document (an XML document) provides information for a receiving media player about the available media content including the time of the media presentation, the different types of content, the different bitrates available and URLs to different media segments. The client uses the MPD information to request the transmission of appropriate audio or video segments.

HTTP Live Streaming (HLS) is a streaming communications protocol that was initially developed by Apple™ but is now supported by many devices beyond just the Apple™ ecosystem. Content is broken down into media segments which are stored as MPEG-TS or MP4 files. The segmenting of the content is performed at multiple bitrates by a segmenter/packager application (hereafter "segmenter"). The segmenter generates a set of playlist files that describe the media segments. These playlist files may be stored in the M3U8 format with each playlist associated with a specific bitrate and containing an URL to the segments for that specific bitrate.

The streams of segments that are delivered to the client media player may include markers, such as, but not limited to SCTE or cuetone markers indicating positions at which additional content may be inserted into the stream. As one example, SCTE-35 markers may be used to identify points where additional content can be inserted into media that is being delivered. SCTE-35 markers are attached to video stream samples as sc35 metadata. For HLS the SCTE-35 markers may be added to the playlist (M3U8) for each variant stream. For MPEG-DASH the markers may be added to the MPD as an eventstream element. Similarly cuetones are sub-audible tones inserted in the stream that indicate points for insertion of content. In other embodiments, an ad break may be identified through the use of discontinuity tags or detecting changes in the URL (from content CDN to SSAI CDN). In one embodiment video, can alternatively be analyzed using machine learning to detect changes in the scene and other factors that could indicate that it's a location where an ad is shown.

Figure 2:
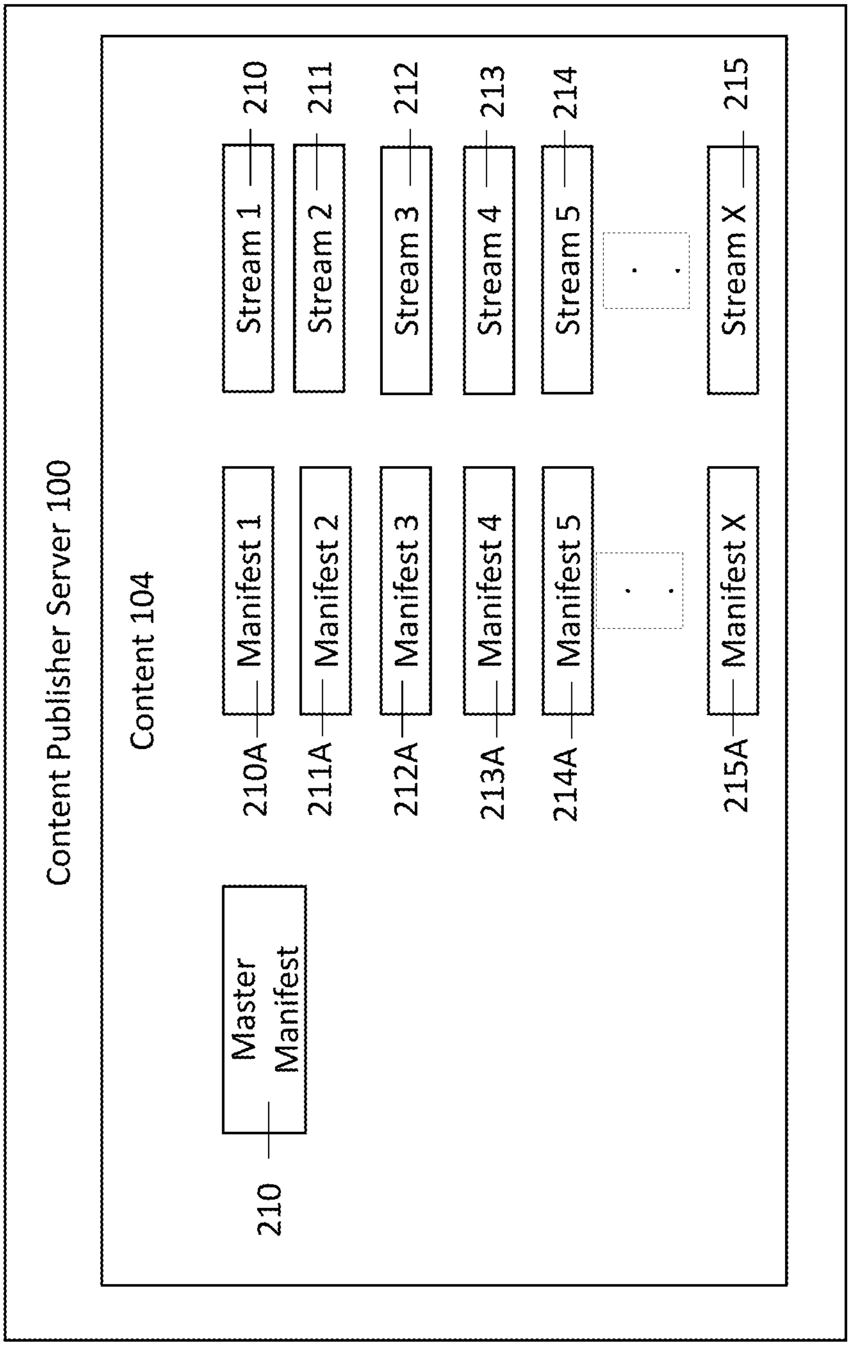
FIG. 2 is a schematic illustration of streaming content provided by a streaming platform in an embodiment.

FIG. 2 is a schematic illustration of streaming content and related information provided by a content publisher server/streaming platform in an embodiment. A master manifest 210 indicates the different streams available at different bit rates. Each stream 210-215 provided by the streaming platform may be accompanied by its own manifest file 210A-215A or playlist depending on the technique being used to deliver the stream. The manifest file (or playlist) indicates where breaks occur in the stream and where additional content may therefore be inserted. These breaks are indicated in these streams through cuetones, scte35 markers, or other markers depending on the standard being used and embodiments repeatedly download the manifest files or playlists of upcoming streaming content to identify when the breaks will occur.

Embodiments may identify appropriate additional content for insertion into streaming content despite an initial request for the additional content including incomplete identifying information. For example in the case of a request for an advertisement, publishers/streaming platforms may send advertisement bid requests to a Supply Side Platform (SSP) for advertisements to be displayed during an upcoming stream ad break in a stream being delivered to a user device. The bid requests may include information about the app, sometimes including device info, user agent, and other signals that advertisers are interested in for targeting. However, publishers generally do not include content related information specific to what channel or show the user is watching. Often the only content related information is the genre (e.g. Action, Documentary, Comedy, Romance, etc.) and/or rating (e.g. G, PG, R, NR) of the program being watched. However, streaming platforms offering FAST services (e.g. Pluto TV™, The Roku Channel™, TUBI™, etc.)

often have a publicly available Electronic Programming Guide (EPG) and embodiments may use its information, or equivalent sources of information, to supplement the request information. These FAST services resemble cable television, with an offering of channels with pre-scheduled content. The EPG is the guide to those channels indicating what is scheduled on each channel throughout the course of the day.

Embodiments leverage incomplete information in a request for additional content (incomplete in that it doesn't specifically indicate the program against which the additional content will be displayed) such as by leveraging the genre and/or rating information contained in a request along with analysis of the EPG in order to identify the specific program being viewed on the user device that will eventually receive the additional content. As noted above, in some embodiments, the request for additional content may be a request for an advertisement. FIG. 3A depicts handling of an advertising bid request in an exemplary embodiment using retrieved information from an EPG to supplement the bid request. As depicted, an exemplary EPG 300 shows three streams for a streaming platform. The first stream is a channel devoted to action movies (Action 301). The second stream is a channel that plays comedy movies (Comedy 302). The third stream is a channel showing documentaries (Documentary 303). The streams 301-303 may be streams delivered via HLS or DASH, or streams generated using another media standard. Each of the channels may have programming that is scheduled to appear in certain time slots. The programs include ad breaks. For example, The program "Abandoned Ruins™" includes Ad Break A 311 scheduled to take place at 10:01 a.m. The movie "Blues Brothers™" includes Ad Break B 312 which is also scheduled to take place at 10:01 a.m. The program "Search for the Bismarck™" includes Ad Break C 313 scheduled to take place later at 10:20 a.m. These ad breaks are not visible or indicated in the EPG. They are however identifiable in the manifest files or playlists for the video stream (generally HLS, DASH, or some other standard). Ad breaks are indicated in these streams through cuetones, scte35 markers, or other markers depending on the standard being used. Each of these streams, and in particular their associated manifest files, is continuously downloaded and analyzed by the analysis module in the additional content server to look for ad breaks and the times of those ad breaks are recorded.

Continuing with the example of FIG. 3A, when the bid request is received, the analysis module notes the time the request was made and which app is receiving the content (the identity of the app is contained in the request). In some embodiments, the request includes a timestamp which is read by the analysis module. In another embodiment, the request time is estimated by the analysis module by identifying the time the request was received at the additional content server. In FIG. 3A, three bid requests are made, bid request G 321, bid request H 322, and bid request I 323 and the associated data analyzed by the analysis module includes the time of request, genre, and rating. To determine the program being watched, the analysis module compares the time of the bid request to streaming channels on the identified app the content is being delivered to (e.g. currently shown programs on Pluto TV™) that have an ad break near that time (determined via the times identified in the downloaded manifests) and narrow down the set of channels the user could be viewing. The bid request time may be up to a few minutes before the ad break in cases where ads are pre-fetched. Once a subset of candidate channels is determined by the analysis module, the genre and/or rating information from the bid request is used to determine which of the candidate channels matches. If there is any ambiguity (two candidate channels or more have the same genre and/or rating) then the bid request may be ignored for the purpose of show identification depending on pre-determined criteria for handling ambiguous results. For example, in such a case default generic content may be provided. When there is only one candidate channel after filtering for genre and/or rating, the channel data is then checked in the EPG by the analysis module to determine the name of the show scheduled at that time which indicates the channel and show being viewed by the user for the bid request. It will be appreciated that the use of both genre and rating by the analysis module in matching the request to the candidate channels will lead to a more accurate determination of the current program as opposed to the use of only one of genre and rating.

With respect to the example in FIG. 3A, bid request G 321 has a request time of 10:00, with a genre of Documentary, and rating of PG. As noted above the request time may be provided via an accompanying timestamp or determined by receipt time. The analysis module 125 looks at the video streams manifest files being downloaded and analyzes them to find any ad breaks that occur within a few minutes of 10:00 (the timestamp of the bid request), finding ad breaks A 311 and B 312 associated with Stream 3 (Documentary) 303 and Stream 2 (Comedy) 302 respectively (and ignoring ad break C 313 in Stream 3 (Documentary) 303 as too far away in time). The analysis module then determines which of Stream 2 302 and Stream 3 303 has programming airing at that point in time with a genre matching "Documentary" and rating of "PG" which were the genre and rating provided in the bid request. The analysis module narrows down the channel to Stream 3 (Documentary) 303 which is broadcasting the show "Abandoned Ruins" which has a scheduled ad break A 311 scheduled for 10:01. Additional content appropriate to that program may then be provided to the requesting streaming platform. Embodiments may thus offer advertisers and other content providers the ability to target specific programs to run their additional content against with increased certainty. The additional content providers can also be offered the ability to block specific programs provided by the streaming platforms that are not brand safe.

It should be appreciated that the vast majority of advertisements that people see online or when receiving FAST services are programmatically generated via programmatic bid requests and these bid requests frequently include an auction process. Publishers make their ad space inventory available with the aid of SSPs. The SSP provides information about the available ad space from the bid request coupled with any additional information known about the user gathered either from the bid request or gathered from external sources. Advertisers use Demand Side Platforms (DSPs) to purchase the available ad space setting various criteria in the form of what they are willing to pay and what attributes are desired for a target audience. In some cases, the advertisers may want ads shown against a specific program and in other cases they may want to avoid a specific program if it is not consistent for example with the brand being advertised in the creative. Ad Exchanges work as intermediaries between the SSPs and DSPs. Embodiments of the present invention provide an analysis module that provides additional information in the form of determining specific program identity that can be added to the bid request. In some embodiments, the analysis module may be part of the SSP which specifically identifies the program before attempting to process the request. In another embodiment, the analysis module may be part of an Ad Exchange that has received a bid request from an SSP without the specific program being identified and supplements the information from the bid request by adding the program identity to the request information e.g. before conducting an auction.

Figure 3B:
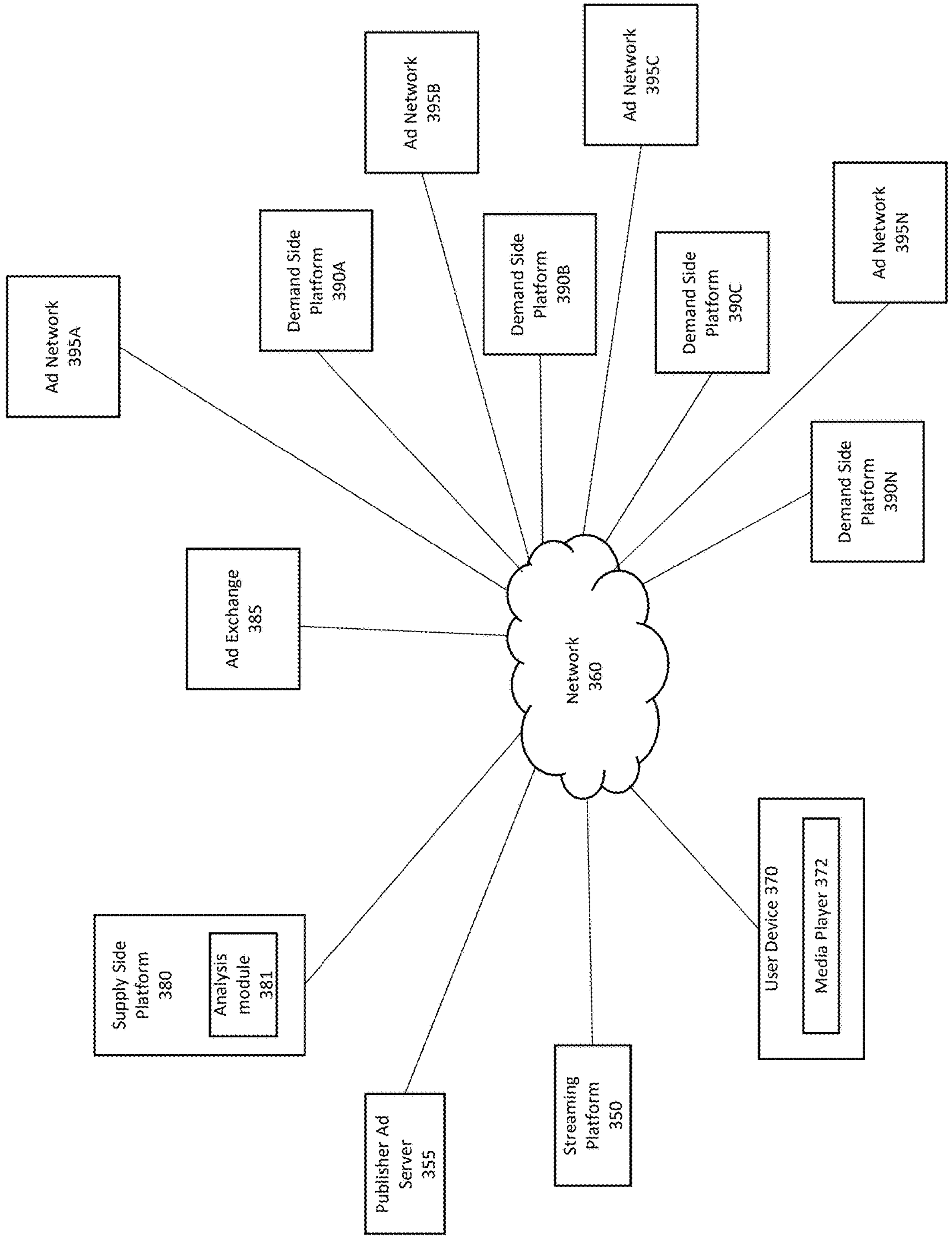
FIG. 3B depicts an exemplary network environment for handling an advertising bid request in an exemplary embodiment.

FIG. 3B depicts a network environment for handling an advertising bid request in an exemplary embodiment. A streaming platform 350 provides a stream of content over network 360 to media player 372 on user device 370. For example, streaming platform 350 may provide FAST services. In advance of an upcoming ad break, streaming platform 350 sends a bid request to Supply Side Platform 380 to obtain an ad creative to be inserted into the stream being delivered to user device 370. The bid request includes some information about the content being streamed (e.g. genre and/or rating) but doesn't explicitly identify the streamed content which makes filling the ad request with appropriate content difficult. However, as previously discussed, in some embodiments, an analysis module 381 may use the EPG data or similar data for the FAST programming being provided by streaming platform 350 in combination with the partial information contained in the bid request (i.e. information not definitively identifying the program being streamed) in order to identify the streamed content. The publisher/streaming platform may also supplement the bid request with additional information known about the user by its own ad server 355 or external sources. After the streamed content is identified, Supply Side Platform 380 can attempt to satisfy the request from its own sources of ad creatives or send the bid request for the identified program to an Ad Exchange 385 and/or one or more of DSPs 390A-390N and/or Ad Networks 395A-395 to provide the creatives. In some embodiments a Real Time Bidding (RTB) auction may be conducted to satisfy the request with the now identified program with the winning bidder supplying an ad creative for insertion into the stream provided by the streaming platform.

In some embodiments, further data can be queried once channel and show information is known including detailed descriptions of the program, actors and directors, ratings, and other metadata that is available through third party data sources. This channel and show information and associated metadata can then also be targeted for advertising by including the information in the bid request.

Figure 4A:
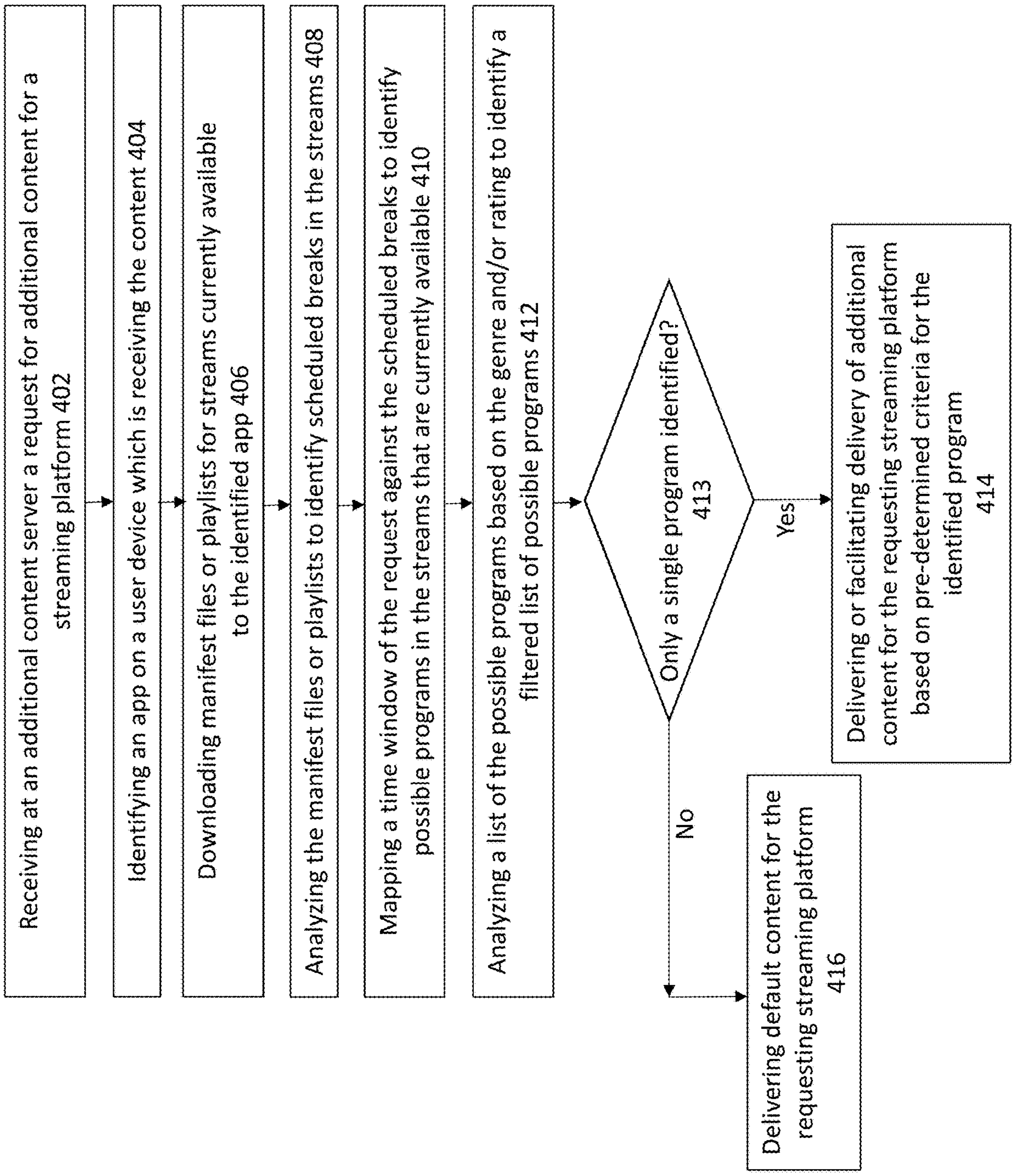
FIG. 4A depicts an exemplary sequence of steps to identify a stream of content being provided by a separate streaming platform when responding to a request to provide additional content in an exemplary embodiment.

FIG. 4A depicts an exemplary sequence of steps followed by an embodiment of the present invention to identify a program on a streaming channel being provided by a streaming platform as part of a request to provide additional content. The sequence begins with an analysis module on an additional content server receiving a request for additional content from a streaming platform (step 402). In some embodiments the additional content server may include a supply side platform. The request may be timestamped or the receiving server may calculate the time it was sent based upon the time it was received. The request may be accompanied by a genre and rating for the content, or similar information, but is not accompanied by a name or identifier that definitively identifies the content being delivered. The app associated with the stream being delivered is indicated in the request and is identified by the analysis module (step 404). The analysis module repeatedly downloads manifest files or playlists for streams currently available on the identified app (step 406). The manifest files or playlists are analyzed to identify scheduled breaks in the streams (step 408). The analysis module maps a time window of when the request was made against the scheduled breaks to identify possible programs in the streams that are currently available (step 410). A list of the possible programs is then filtered by the analysis module based on the genre and rating to identify a filtered list of possible programs (step 412). When this filtered list of possible programs contains only a single program (step 413), the additional content server delivers or facilitates the delivery of additional content for the requesting streaming platform based on pre-determined criteria (step 414). When this filtered list of possible programs does not contain only a single program (step 413), pre-determined criteria may dictate the delivery of generic default content for the streaming platform for insertion into the ad break.

Figure 4B:
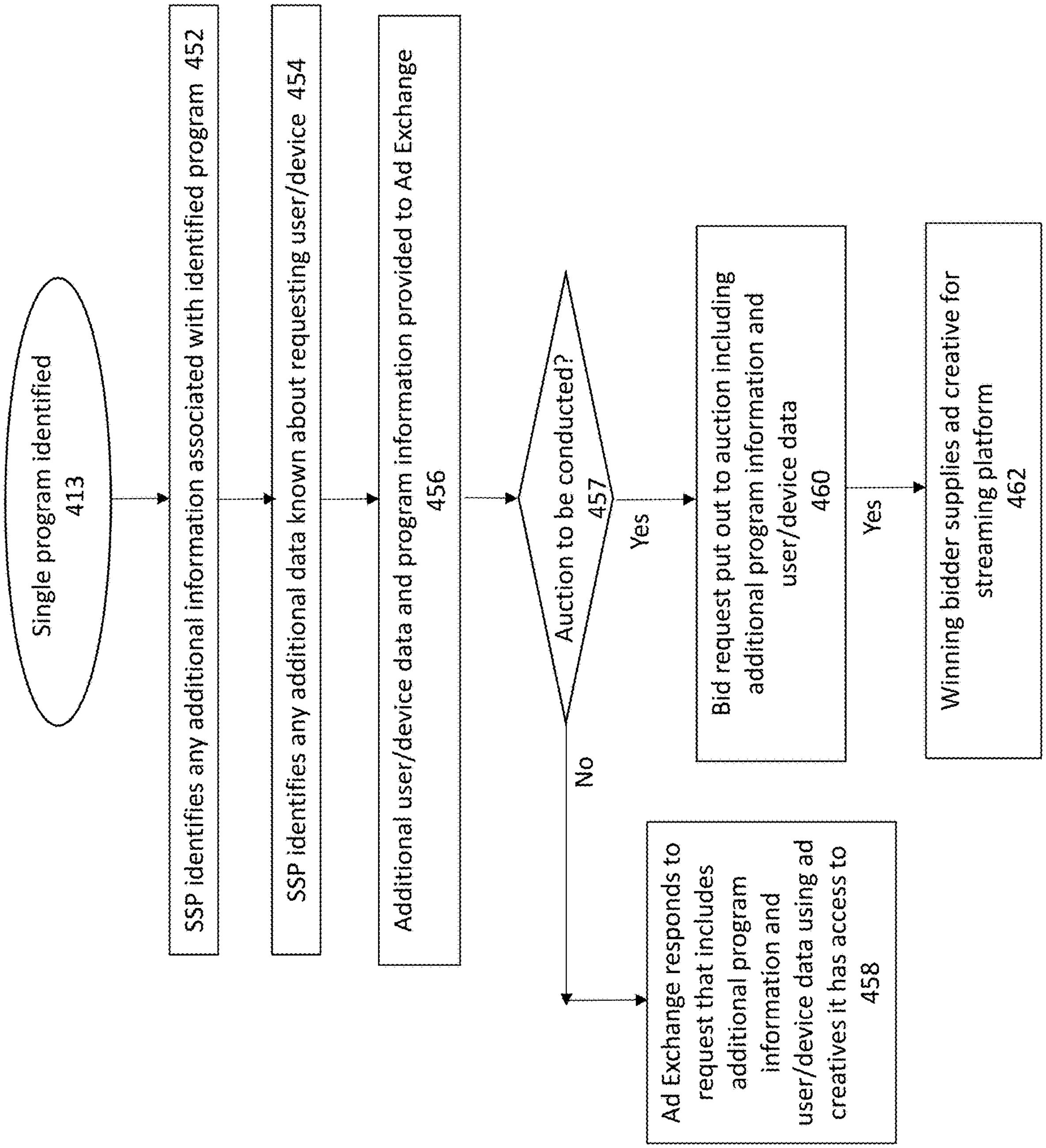
FIG. 4B depicts an exemplary sequence of steps to handle an advertising bid request an exemplary embodiment.

As previously discussed, in some embodiments the request for additional content may be a request for an advertisement to be inserted into an ad break in a stream being delivered by the streaming platform. FIG. 4B depicts an exemplary sequence of steps to handle an advertising bid request an exemplary embodiment. Once a single program has been identified by the analysis module (step 413 in FIG. 4A) the sequence begins with the SSP identifying any additional information about the now-identified program and adding it to the bid request (step 452). The SSP may also attempt to identify any additional data about the requesting user/device receiving the streamed content (step 454). The additional program information and/or user/device data may be provided with the bid request to an Ad Exchange (step 456). If the bid request does not indicate that an auction is to be conducted (step 457), the Ad Exchange may attempt to fill and/or facilitate filling the request which now includes the additional information and/or user/device data using ad creatives to which it has access (step (458). In some embodiments, the Ad Exchange may control the ad creative. In other embodiments, the Ad Exchange may receive available ad creatives from DSPs or Ad Networks. If an auction is to be conducted (step 457), the bid request is put out for auction with the request including the additional information and/or user/device data (step 460) and the winning bidder supplies an ad creative for the streaming platform (step 462).

Portions or all of the embodiments of the present invention may be provided as one or more computer-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in many computing languages.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

I claim:

1. A computing device-implemented method to identify content being delivered by a separate streaming platform, the computing device including at least one processor, the method comprising:

receiving at an additional content server a request for additional content suitable for insertion into a stream of content being delivered by a streaming platform to a user device, the request accompanied by at least one of a genre and rating for the content being delivered by the streaming platform to the user device but not accompanied by a name or identifier of the content being delivered by the streaming platform to the user device;

identifying an app on the user device which is receiving the content;

repeatedly downloading manifest files or playlists for streams currently available to users of the identified app to identify the available streams;

analyzing the downloaded manifest files or playlists to identify upcoming scheduled breaks in the streams;

mapping a time of the request against the upcoming scheduled breaks to identify possible programs in the streams that are currently available to which the request could apply based on the time of the request;

analyzing a list of the possible programs based on a genre and rating of the programs in the list of possible programs to identify a filtered list of possible programs corresponding to the at least one of a genre and rating accompanying the request; and delivering or facilitating the delivery of additional content to the requesting streaming platform based on pre-determined criteria associated with an identified program in the filtered list when the filtered list contains only a single program.

2. The method of claim 1 wherein the request for additional content includes a timestamp.

3. The method of claim 1 wherein the pre-determined criteria indicates some additional content is not suitable for some genres or ratings.

4. The method of claim 1 wherein the pre-determined criteria indicates some additional content is intended for specific programs.

5. The method of claim 1 wherein the pre-determined criteria indicates some additional content is not suitable for one or more specific programs.

6. The method of claim 1 wherein the streaming platform delivers content streams using DASH or HLS.

7. The method of claim 1 wherein the scheduled breaks are identified based on the presence of cuetones, scte35 markers, or other markers.

8. The method of claim 1 wherein the additional content is a public service announcement.

9. The method of claim 1 wherein the additional content is additional information related to the program.

10. The method of claim 1 wherein the additional content is an advertisement.

11. The method of claim 10 wherein the request is an advertising bid request.

12. The method of claim 11 wherein the additional content server hosts a Supply Side Platform.

13. The method of claim 1, further comprising:

retrieving metadata associated with the identified single program; and delivering additional content based on the identified single program and the metadata.

14. The method of claim 13 wherein the metadata includes one or more of a show description, actor information, director information, rating information and/or 3rd party metadata.

15. The method of claim 1, wherein the identified program is subsequently identified in an auction request soliciting the additional content that was requested for insertion into the stream being delivered by the streaming platform to the user device.

16. A system for identifying content being delivered by a separate streaming platform, comprising:

a computing device including at least one processor, the computing device hosting a supply side platform, the supply side platform configured to:

receive a request for additional content suitable for insertion into a stream of content being delivered by a streaming platform to a user device, the request accompanied by at least one of a genre and rating for the content being delivered by the streaming platform to the user device but not accompanied by a name or identifier of the content being delivered by the streaming platform to the user device, identify an app on the user device which is receiving the content, repeatedly download manifest files or playlists for streams currently available to users of the identified app to identify the available streams, analyze the downloaded manifest files or playlists to identify upcoming scheduled breaks in the streams, map a time of the request against the upcoming scheduled breaks to identify possible programs in the streams that are currently available to which the request could apply based on the time of the request, analyze a list of the possible programs based on a genre and rating of the programs in the list of possible programs to identify a filtered list of possible programs corresponding to the at least one of a genre and rating accompanying the request, and deliver or facilitate the delivery of additional content to the requesting streaming platform based on pre-determined criteria associated with an identified program in the filtered list when the filtered list contains only a single program; and a network accessible source of additional content.

17. The system of claim 16 wherein the pre-determined criteria prevents specified additional content from being delivered to the streaming platform based on the identified program.

18. The system of claim 16 wherein the pre-determined criteria indicates some additional content is intended for specific programs.

19. The system of claim 16, wherein the additional content is identified following an auction in which the identity of the identified program is provided by the supply side platform, wherein the additional content is provided to the streaming platform for delivery to the user device.

20. The system of claim 19 in which the additional content is provided via at least one of an ad exchange, ad network and demand side platform.

21. A non-transitory medium holding executable instructions for identifying content being delivered by a streaming platform, the instructions when executed by at least one computing device that includes at least one processor causing the at least one computing device to:

receive a request for additional content suitable for insertion into a stream of content being delivered by a streaming platform to a user device, the request accompanied by at least one of a genre and rating for the content being delivered by the streaming platform to the user device but not accompanied by a name or identifier of the content being delivered by the streaming platform to the user device;

identify an app on the user device which is receiving the content;

repeatedly download manifest files or playlists for streams currently available to users of the identified app to identify the available streams;

analyze the downloaded manifest files or playlists to identify upcoming scheduled breaks in the streams;

map a time of the request against the upcoming scheduled breaks to identify possible programs in the streams that are currently available to which the request could apply based on the time of the request;

analyze a list of the possible programs based on a genre and rating of the programs in the list of possible programs to identify a filtered list of possible programs corresponding to the at least one of a genre and rating accompanying the request; and deliver or facilitate delivery of additional content to the requesting streaming platform based on pre-determined criteria associated with an identified program in the filtered list when the filtered list contains only a single program.

22. The medium of claim 21 wherein the request for additional content includes a timestamp.

23. The medium of claim 21 wherein the pre-determined criteria indicates some additional content is not suitable for some genres or ratings.

24. The medium of claim 21 wherein the pre-determined criteria indicates some additional content is intended for specific programs.

25. The medium of claim 21 wherein the pre-determined criteria indicates some additional content is not suitable for one or more specific programs.

26. The medium of claim 21 wherein the streaming platform delivers content streams using DASH or HLS.

27. The medium of claim 21 wherein the scheduled breaks are identified based on the presence of cuetones, scte35 markers, or other markers.

28. The medium of claim 21 wherein the additional content is a public service announcement.

29. The medium of claim 21 wherein the additional content is additional information related to the program.

30. The medium of claim 21 wherein the additional content is an advertisement.

31. The medium of claim 30 wherein the request is an advertising bid request.

32. The medium of claim 31 wherein the additional content server hosts a Supply Side Platform.

33. The medium of claim 21, further comprising:

retrieving metadata associated with the identified single program; and delivering additional content based on the identified single program and the metadata.

34. The medium of claim 33 wherein the metadata includes one or more of a show description, actor information, director information, rating information and/or $3^{rd}$ party metadata.

35. The medium of claim 21, wherein the identified program is subsequently identified in an auction request soliciting the additional content that was requested for insertion into the stream being delivered by the streaming platform to the user device.

* * * * *